United States Patent [19]

Jones

[11] 4,358,517

[45] Nov. 9, 1982

[54] NICKEL-ZINC CELL

[75] Inventor: Richard A. Jones, Anderson, Ind.

[73] Assignee: General Motors Corporation, Detroit, Mich.

[21] Appl. No.: 324,159

[22] Filed: Nov. 23, 1981

Related U.S. Application Data

[63] Continuation-in-part of Ser. No. 202,205, Oct. 30, 1980, abandoned, which is a continuation of Ser. No. 89,378, Oct. 30, 1979, abandoned.

[51] Int. Cl.$^3$ .............................................. H01M 6/04
[52] U.S. Cl. .................................... 429/206; 429/229
[58] Field of Search ............................... 429/229–231, 429/206, 223

[56] References Cited

U.S. PATENT DOCUMENTS 4,041,221  8/1977  Berchielli et al. ............... 429/229 X Primary Examiner—Charles F. LeFevour
Attorney, Agent, or Firm—Lawrence B. Plant

[57] ABSTRACT

A long-lived, nickel-zinc cell which is characterized by a zinc electrode having a copper grid and an active material comprising zinc-rich particles, calcium-rich particles and an entanglement of cellulose fibers for irrigating the mix and supporting Ca-zincate formation and persistance. Lead compounds may be added for improved turn around efficiency and reduced $H_2O$ loss.

10 Claims, 5 Drawing Figures

NICKEL-ZINC CELL

This is a continuation-in-part application of application Ser. No. 202,205 filed Oct. 30, 1980 which in turn is a continuation of application Ser. No. 089,378 filed Oct. 30, 1979, both now abandoned.

BACKGROUND OF THE INVENTION

This invention relates to Ni-Zn batteries characterized by longevity at high levels of retained capacity and power, and particularly to full-sized batteries suitable for electric vehicle and SLI applications. Such Ni-Zn batteries will comprise a plurality of nickel electrode plates (i.e., NiOOH in charged state) closely interleafed with a plurality of zinc electrode plates (i.e., zinc in the charged state). More particularly, this invention relates to zinc electrodes for such batteries.

Zinc electrodes have heretofore typically been made by: homogeneously mixing zinc oxide powder with such customary binder materials as polystyrene, polytetrafluoroethylene, polyvinylidene fluoride, methylcellulose, carboxymethylcellulose, polyvinylalcohol or polyethylene oxide; applying the mix to a conducting-/supporting gridwork; and pressing the mix to hold the powders together. During formation (i.e., initial charge), the zinc oxide transforms to zinc. In some cases, such electrodes have demonstrated signs of segregation of the zinc, zinc oxide and binder—especially toward the ends of their useful lives. In other cases (i.e. with the water-soluble/KOH-insoluble cellulosic type binders), such electrodes have demonstrated signs of binder migration and the formation of films of the binder on the surface of the electrodes.

Such electrodes have heretofore generally demonstrated: relatively poor zinc utilization efficiency; relatively poor capacity retention and power retention upon cycling (i.e., charging and discharging)—often falling below a useful level, for many applications, after too few cycles; and relatively short useful lives. To offset these shortcomings, workers in the field have typically provided nickel-zinc batteries with approximately three times more zinc electrode capacity than nickel electrode capacity [e.g., 300 AH of zinc oxide per 100 AH $Ni(OH)_2$ in the discharged state].

Over the years, a number of additions to the zinc electrode have been proposed. Small additions of lead (i.e., as Pb, PbO or $Pb_3O_4$) or copper powder have been suggested to promote better utilization of the zinc and hence improve the capacity of the electrode. It has likewise been proposed to add $H_2$-gas suppressants to raise the hydrogen overvoltage and thereby reduce $H_2$ gassing while charging the battery. Among the $H_2$ suppressants suggested are $Tl_2O_3$, PbO, CdO, and mixtures thereof with each other and with $SnO_2$, $In(OH)_3$ and $Ga_2O_3$. These materials have also been said to be effective in reducing zinc electrode "shape change".

"Shape change" is a phenomenon which results from an uneven deposition of the zinc on the electrode on succeeding charge and discharge cycles. More zinc tends to accumulate in the center of the electrode where it becomes dense and nonreactive while the edges of the electrode become depleted of zinc. The net result is a deformed electrode having a very small effective surface area available for reaction. While the "shape change" phenomenon is not fully understood it is seen to commonly occur in cells having high zinc mobility and on plates having uneven current distributions thereacross. This condition is amplified as the surface area of the electrode increases and has been a particular problem in full-sized electric vehicle and SLI batteries where the zinc plates must often exceed 25 $in^2$ in area in order to provide adequate energy and power.

Calcium compounds (i.e., calcium oxide and/or calcium hydroxide) have been added to zinc electrodes to promote the formation of calcium zincate (i.e., $CaZn_2O_8H_{10}$) during cell discharge. In such calcium-rich electrodes, the calcium reacts with the zinc oxide formed on cell discharge (i.e. said by some to be "potassium zincate") to form relatively insoluble calciun zincate (hereafter Ca-zincate). This increases cell cycle life by reducing zinc mobility and reducing the formation of zinc dendrites which can bridge the interelectrode gap and short out the cell. By way of contrast, in calcium-free cells the zinc oxide reaction product is quite soluble in the KOH electrolyte hence creating loss of zinc from the electrode and high zinc mobility throughout the cell. Such zinc mobility is believed to contribute to both zinc dendrite formation and zinc electrode "shape change".

Though the aforesaid advantages of adding calcium to zinc electrodes has been demonstrated in laboratory test cells, surprisingly it has not been reported to have been adopted for use in full-sized batteries. The reason for this is not known. Perhaps it is due to the tendency of Ca-zincate toward cementation, as has been reported by some. Perhaps it is due to the difficulty of duplicating, in full-sized batteries, the results observed in the laboratory cells.

I have found that irrigation of Ca-rich zinc electrodes with dilute electrolyte (i.e., concentrations below about 30% by weight KOH) yields long-lived electrodes with high levels of retained capacity and retained power in full-sized batteries and all with no evidence of Ca-zincate cementation or reduced Ca-zincate effectiveness. The concentration of the electrolyte within the zinc electrode significantly affects the effectiveness of the calcium in consuming the zinc as Ca-zincate. When the electrolyte concentration exceeds a certain level (hereafter Ca-zincate dissociation concentration), Ca-zincate will neither form in substantial quantities nor, if earlier formed, persist in significant amounts. This concentration varies inversely with respect to temperature. That is to say, as the temperature increases the Ca-zincate dissociation concentration decreases over the normal operating temperatures of electric vehicle and SLI batteries. Hence Ni-Zn batteries, and particularly zinc electrodes, must be designed to insure that the concentrations of the electrolyte within the zinc electrode does not exceed the Ca-zincate dissociation concentration. Achievement of this goal is complicated by the fact that the Ca-zincate formation reaction consumes significantly more water ($H_2O$) than does the potassium zincate formation reaction occuring in Ca-free electrodes. As a result, during discharge (i.e., when the Ca-zincate is being formed), the concentration of the electrolyte contained within the zinc electrode (hereafter the electrolyte permeate) can quickly rise above the Ca-zincate dissociation concentration even though the ambient electrolyte between and around the electrodes remains well below the dissociation concentration. The higher the discharge rate the faster the water is consumed and the greater the need for adequate irrigation.

I have concluded that the benefits of calcium in zinc electrodes can only be achieved by proper management of the concentration of the electrolyte permeate and more specifically by keeping that concentration below the Ca-zincate dissociation concentration over the operating temperature range of the battery. The problem of electrolyte concentration management is particularly acute in full-sized, multiplate, commercial batteries which must typically operate in an electrolyte-starved environment (i.e., low electrolyte-to-active material ratio) and over a wide temperature range.

It is the principal object of the present invention to provide a long-lived, Ni-Zn battery having improved zinc utilization and excellent retained capacity upon repeated cycling and which is characterized by a zinc electrode whose active material contains a Ca-zincate former and is pervaded with porous, wick-like, absorbent, hydrophilic fibers for so irrigating the active material with dilute electrolyte as to permit the formation and persistence of Ca-zincate therein during discharge of the battery and to reduce any tendency of the Ca-zincate toward cementation.

It is a further object of the present invention to provide a long-lived, Ni-Zn battery having improved zinc utilization and excellent retained capacity and power upon repeated cycling and which is characterized by a zinc electrode which is essentially free of customary binder materials and whose active material includes a Ca-zincate former and is pervaded with an entanglement of stable, reinforcing, porous, wick-like, absorbent, hydrophilic fibers for so irrigating the active material with dilute electrolyte as to permit the formation and persistance of Ca-zincate therein during discharge of the battery and to reduce any tendency of the Ca-zincate toward cementation.

It is another object of the present invention to provide a long-lived, Ni-Zn battery having improved zinc utilization and excellent retained capacity and power upon repeated cycling and which is characterized by a zinc electrode whose active material includes a Ca-zincate former and a hydrogen gas suppressant, and is pervaded with porous, wick-like, absorbent, hydrophilic fibers for so irrigating the active material with dilute electrolyte as to permit the formation and persistence of Ca-zincate therein during discharge of the battery and to reduce any tendency of the Ca-zincate toward cementation.

These and other objects and advantages of the present invention will become more readily apparent from the detailed description which follows.

BRIEF DESCRIPTION OF THE INVENTION

Figure 1:
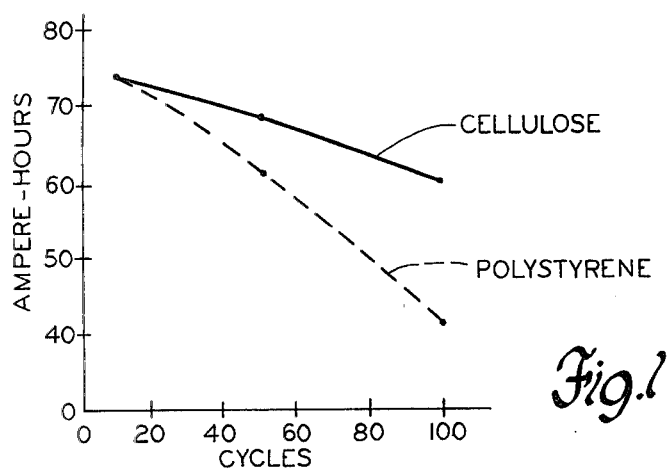
FIG. 1 is a curve showing the comparitive effectiveness of cellulose fibers as a performance-improving binder in the zinc electrodes of a Ni-Zn battery.

The invention comprehends a zinc electrode for an alkaline, Ni-Zn cell comprising a substantially homogeneous mixture of: zinc-rich particles (i.e., zinc, zinc hydroxide and/or zinc oxide); calcium-rich particles for forming calcium zincate during cell discharge; and an entanglement of porous, wick-like fibers which are sufficiently hydrophilic and absorbent (e.g. cellulose) as to irrigate the mixture enough during discharge to prevent the electrolyte concentration therein (i.e., the electrolyte permeate) from rising above the Ca-zincate dissociation concentration. Normally the electrode will be made in the uncharged state by mixing zinc oxide, calcium oxide or hydroxide and the fibers. Alternatively, the electrode may be made from a mixture of Ca-zincate and the fibers which, upon charging (i.e., "formation"), converts to the aforesaid Zn-rich/Ca-rich/fiber mixture.

Preferred electrodes will comprise cellulose fibers which serve as the only binder for the reactive particles. The most preferred electrodes will employ natural cellulose fibers as well as small quantities of $Pb_3O_4$ for improved turn around efficiency and reduced cell water loss.

The term "cellulose" fibers is herein used to include both natural and regenerated cellulose fibers. By "natural" cellulose fibers is meant cellulose fibers substantially as they occur in nature's plant life and without dissolution and regeneration from solution. By "regenerated" cellulose fibers is meant those man-made fibers (e.g., rayon) the cellulose of which was first dissolved in solution and then recovered therefrom in a form substantially identical to the starting cellulose fibers except for being partially hydrolyzed and degraded into somewhat shorter molecules. Zinc electrodes containing natural cellulose fibers (i.e., the most preferred fibers) and no other binder have demonstrated superior capacity and power retention after prolonged cycling. Zinc electrodes containing rayon fibers have demonstrated similar, though somewhat less, long term capacity retention.

The precise mechanism by which the cellulose fibers hold the calcium-rich and zinc-rich particles together and maintain electrode capacity and power levels for prolonged periods is not completely understood. It is believed however that the entangling of the fibers, in paper fashion, mechanically retains and strengthens the active material mix while the fibers' extraordinary wettability and absorbency promotes unsurpassed irrigation of the Ca-rich active material with suitably dilute electrolyte. Such irrigation is considered essential to both forming and maintaining Ca-zincate in the electrode.

The Ca-rich particles react with the zinc oxide formed on discharge to form relatively insoluble calcium zincate. The zinc is thus trapped in situ. No more calcium hydroxide need be provided in the electrode than will react with the zinc in the cell environment. About 0.25–1.5 moles of the calcium compound per mole of zinc oxide has been suggested. Any amount more than that serves only to consume valuable space otherwise available for more zinc. In fact, in the presence of cellulose fibers, the Ca-rich particles (e.g., calcium hydroxide) can replace some of the excess zinc otherwise normally provided to insure capacity. While this reduces the amount of zinc otherwise available for reaction no loss in electrode capacity has been observed. In this latter regard, zinc-cellulose-calcium electrodes having zinc oxide to $Ni(OH)_2$ ratios as low as 1.34 have performed excellently.

Figure 5:
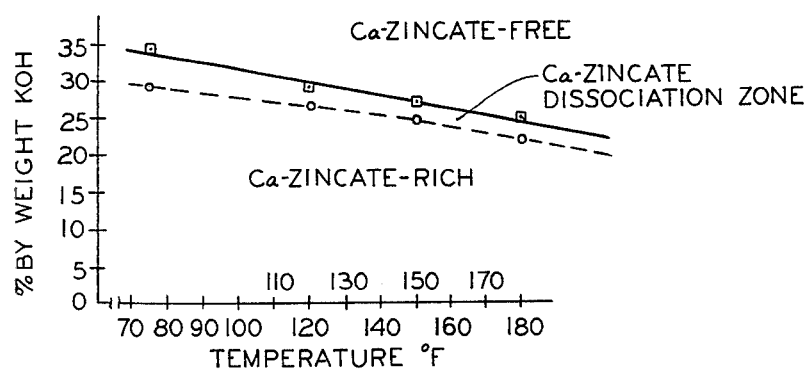
FIG. 5 is a temperature Vs. concentration plot of the approximate Ca-zincate dissociation concentration for KOH electrolyte.

Creation and preservation of the Ca-zincate in the electrode during and following discharge is seen as the crux of the present invention. The ability of Ca-zincate to form and persist in the electrode is dependent on the concentration of the KOH electrolyte therein. In vitro, tests have shown that Ca-zincate will not form or persist in any significant amount in KOH concentrations above about 30% by weight at room temperature, and that as the temperature of the KOH increases the KOH concentration (i.e., Ca-zincate dissociation concentration)

at which the Ca-zincate will form/persist decreases. In these tests, a large batch of Ca-zincate was made from a paste of zinc oxide, $Ca(OH)_2$ [i.e., 1.45 parts of zinc oxide for each part $Ca(OH)_2$] and KOH. The paste was mixed in a beater for several hours until the exothermic reaction had completed and the paste cooled. The Ca-zincate was then ground into small particles. A plurality of individual test samples were prepared in which 4.5 grams of the Ca-zincate was added to 45 cubic centimeters of KOH (i.e., at different strengths) in a plurality of separate beakers. Each test sample was heated to a different test temperature and stirred regularly for periods ranging from nineteen (19) hours to one week. Tests were made at 75° F., 120° F., 150° F. and 180° F. Significant amounts of undissolved particles remained in the beakers at all times and the calcium remained virtually entirely within the undissolved particles. The liquid from each sample was analyzed using atomic absorption techniques while the solids therefrom were analyzed for Ca-zincate using X-ray diffraction techniques. Thereafter each test sample was allowed to cool to room temperature and after several days, a second analysis of the solids was made. FIG. 5 is a concentration-temperature plot of the results of the aforesaid in vitro tests. The upper curve is the KOH concentrations above which substantially no Ca-zincate could be found in the solids at the bottom of the beakers. The lower curve is the KOH concentrations below which high concentrations of Ca-zincate were found in the solids at the bottom of the beakers. Intermediate these curves lesser amounts of Ca-zincate is found in the solids. In the region intermediate these curves significant Ca-zincate dissociation takes place. The tests further showed that the samples which showed no Ca-zincate in the solids, when analyzed hot, displayed high levels of Ca-zincate in the solids after cooling to room temperature.

As the ability of the Ca-zincate to form and persist within the zinc electrode is dependent on the concentration of the KOH within the electrode (i.e., the KOH permeate), it is essential that the KOH permeate concentration be maintained lower than the Ca-zincate dissociation concentration at all times if effective use of the calcium is to be achieved. The concentration of the permeate is affected: (1) by the discharge rate of the battery, which determines the rate at which the Ca-zincate reaction consumes water from the permeate; and (2) by the rate at which the permeate can be diluted with the ambient electrolyte surrounding the zinc electrodes. With adequate irrigation of the zinc electrode, the KOH concentration of the ambient electrolyte can be maintained in the 10%–28%, by weight, range for many applications. For long-lived, full-sized, deep-cycling batteries, ambient electrolyte concentrations of about 20% KOH seems best, especially for electric vehicle batteries which often operate at high discharge rates and at temperatures near 140° F. or more. For shallow cycling applications (e.g., automotive cranking batteries), ambient electrolyte concentrations of about 25% seems best for cold cranking performance.

Figure 2:
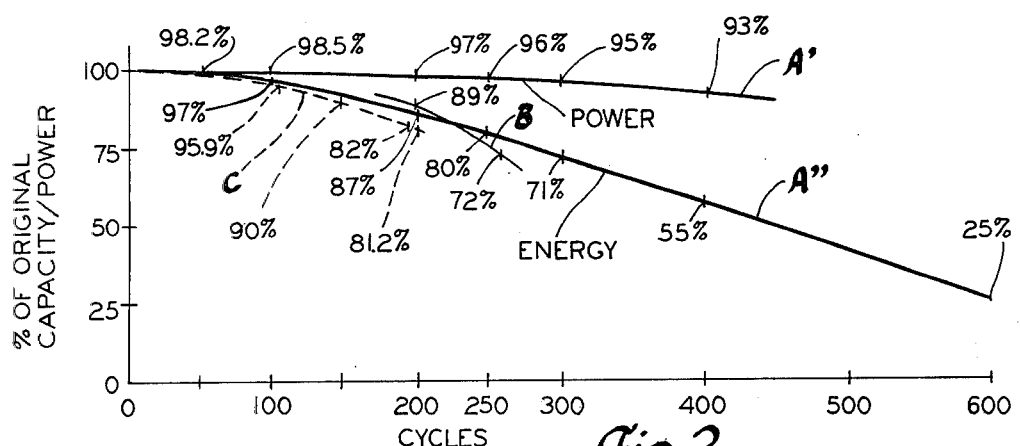
FIGS. 2–4 are curves showing the performance of Ni-Zn cells made in accordance with the present invention.

The KOH permeate concentration can be maintained at sufficiently low levels by irrigating the electrode with adequate amounts of electrolyte whose concentration is below the Ca-zincate dissociation concentration. In accordance with a preferred embodiment of the invention, this irrigation is provided by pervading the zinc electrode with cellulose fibers. For maximum long-lived performance such electrodes will most preferably include natural cellulose fibers which are essentially free of the customary binders used heretofore. In this regard, the natural cellulose fibers are economically available from many natural sources (e.g., cotton, wood, etc.) and, when entangled together, sufficiently mechanically retain and strengthen the active material as not to require other binders. As indicated in FIG. 2 such electrodes can be expected to produce the best long term performance as compared to electrodes containing other binders or even regenerated cellulose alone. The presence of other customary binders is unnecessary and considered undesirable for a number of reasons. First, these other binders are, for the most part, hydrophobic or poorly wettable which tends to retard the degree of irrigation sought to be achieved by the cellulose fibers. Secondly, their tendency to migrate within the cell and/or passivate the electrode, as time goes on, is seen to impede the effectiveness of the cellulose fibers and shorten the useful life of the electrode. Finally, these other binders are electromechanically inert and accordingly consume valuable space otherwise available to active zinc species. This is not to say, however, that such other binders might not be used along with the cellulose fibers so long as they not substantially reduce the effectiveness of the cellulose in adequately irrigating the electrode in support of the Ca-zincate reaction thereon. At least one test, for example, has shown that cells made with a combined cellulose-styrene binder, though acceptable in its early life, did not have as long a projected useful life (i.e., capacity retention wise) as the zinc electrodes with only cellulose as the binder. Hence as a practical matter, since they contribute nothing to the electrode and require additional processing and handling expense binders other than cellulose are better eliminated.

Successful electrodes have been made with both wood-based natural cellulose fibers (i.e., water digested or repulped paper) as well as regenerated cellulose fibers in the form of viscose rayon. Moreover, tests have shown that relatively low grade papers such as newsprint containing about 50% alpha cellulose, 20% lignin and 30% hemicellulose are nearly as effective as high grade filter paper (i.e., Whatman #42) made from cotton fibers and containing 98% alpha cellulose. Success has been achieved with fiber loadings ranging from about 0.5% to about 10% by weight of the active material mix. The lower concentrations are adequate for the making of smaller, thinner plates, while higher concentrations are preferred for larger, thicker plates to achieve maximum irrigation and optimum long-lived electrodes. It has been noted that the higher concentrations also seem to result in lower zinc diffusion throughout the cell.

The most preferred zinc electrodes also include a small quantity of an $H_2$-gas suppressant. Lead (i.e., as $Pb_3O_4$) in quantities of no more than about 4.0% by weight are preferred. In this regard, in addition to suppressing hydrogen evolution in recharge, the lead also improves the turn around efficiency (i.e., watt-hours out/watt-hours in) of the batteries, primarily in the early cycles. Substantially Pb-free electrodes with high cellulose content, on the other hand, have somewhat less turn around efficiency in their early cycles, but have demonstrated higher retained capacities in the last half of their cycle life. In one test, for example, a test cell containing only zinc oxide, $Ca(OH)_2$ and about 10% newsprint, but no lead, lost only 4% of its capacity between cycles 100 and 290 and generally showed a capacity retention curve flatter near the end of cycling than that shown in FIG. 2 for Pb-containing electrodes. The lead also significantly reduces (i.e., about 50%) the water loss which normally occurs on cycling. This has two benefits. First the reduced water loss assists in keeping the KOH concentration below the Ca-zincate dissociation concentration. Secondly it reduces the hydrogen gas polarization within the zinc electrode. Generally it has been observed that increasing the $Pb_3O_4$ content will permit a reduction in cellulose content. More specifically, with $Pb_3O_4$ loadings of less than about 0.5% the best long-lived capacity retention was observed with cellulose loadings between about 5% and 10%. On the other hand, with $Pb_3O_4$ loadings approaching 4%, excellent long-lived capacity retention was obtained with cellulose loadings around 1%. Finally, scanning election microscope studies have revealed that the lead migrates to the grid and creates a lead-rich zone on the surface of the grid which may serve, to protect the copper grid from KOH attack. The optimum electrode then for any given application will preferably contain both $Pb_3O_4$ and cellulose and preferably at least about 0.5% $Pb_3O_4$.

Still further, the preferred embodiment includes a copper grid. The high conductivity of the copper grid provides more uniform current distribution across the face of the electrode and reduces the internal resistance of the battery, both of which seem to have an affect on reducing the rate of shape change. The copper, which is ordinarily soluble in KOH, seems to somehow be protected by the cellulose and/or lead so as not to be destroyed by the KOH.

The zinc electrodes are separated from the nickel electrodes by microporous membranes or separators as a final protection against interplate dendrite growth and internal cell shorting. The separators, however, have the disadvantage of resisting current flow within the cell. The higher the resistance of the separators the lower the power and the greater the internal heating of the battery. Excessive internal heating of the battery shortens the life thereof. I prefer to use relatively low resistance polyolefinic separators such as Celgard 2400 or 2500 with suitable wetting agents. This reduces the internal electrical resistance of the cells and permits better electrolyte circulation. In this latter regard, the zinc electrode of the present invention makes possible the use of such low resistance separators whose porosity and pore size would not otherwise alone be adequate to suppress interplate dendrite growth for a prolonged period. This combination of low resistance grids and separators, coupled with Ca-zincate formation and preservation by cellulose-induced irrigation, is seen to work in concert to suppress the rate of dendrite growth and shape change while at the same time yielding lower internal heating and improved power over extended periods not heretofore achieved in full-sized Ni-Zn batteries.

ELECTRODE MANUFACTURE

Zinc electrodes made in accordance with the present invention may be made from zinc, zinc oxide, zinc hydroxide or calcium zincate particles. Preferably, the electrodes are made by mixing zinc oxide and calcium hydroxide along with the cellulose fibers in an aqueous slurry or paste and applying the mix to the grid (e.g., expanded metal, screen, perforated sheet, etc.). Thereafter, the electrode is pressed, dried and repressed to a predetermined finished thickness. Plates so made with zinc oxide are said to be in the "unformed" state, and are subsequently converted to zinc during the "formation" stage of the battery (i.e., the initial charge given to the battery). Thereafter, the electrode cycles between zinc, in the charged state, to calcium zincate in the discharged state.

In making the zinc electrode, a swatch of paper of appropriate weight is cut from a convenient source (e.g., roll or sheet). The switch is then preferably cut in half. One of the halves is cut or diced into very small squares, and such that the fibers are minced to lengths less than the size of the openings in the grid. The diced half and the undiced half are then added to water in a blender and stirred until the paper is repulped and a slurry of the fibers is formed. The other ingredients (i.e., zinc oxide, $Ca(OH)_2$, $Pb_3O_4$, etc.) are added to the slurry in the blender and homogenized with the cellulose fibers. The slurry is then applied to the grid. Thick slurries may be pasted onto the grid as by a spatula or conventional grid pasting equipment (e.g., belt paster). Thin slurries are best applied to the grid using a conventional vacuum table technique. In either event, one half of the slurry is applied to one face of the grid, and the other half of the slurry applied to the other face of the grid. The smaller fibers from the dicing operation bridge the openings in the grid and become entangled with the longer uncut fibers and tend to tie longer fibers together through the openings.

SPECIFIC EXAMPLES AND TEST RESULTS

A number of full-sized cells have been tested. Essentially, these cells comprised a nickel electrode, an appropriate separator system, a KOH electrolyte and the particular zinc electrode being tested. The cells had an odd number of plates stacked such that there was one more zinc negative electrode than nickel positive, and such that both end electrodes were negative electrodes. The end electrodes had approximately one-half the capacity of the other negative electrodes in the center of the cell stack. All electrodes, both positive and negative, were 7.2 inches tall by 3.94 inches wide. The nickel electrodes were substantially the same for all tests and included a nickel plaque substrate (i.e., General Electric Co.) impregnated with nickel hydroxide and cobalt hydroxide. The plaque included a perforated steel sheet (i.e., 0.004 inch thick) nickel plated to a Ni thickness of about 0.00025 inch Ni. The perforations had a diameter of about 0.077 inch and a density of about 78 perforations per square inch of substrate. The sheet was coated by the manufacturer with carbonyl nickel powder and sintered to form a substrate which is 0.036 inch thick, has an overall (i.e., including steel sheet) porosity of about 73% and an average pore size of about 10 microns. The plaque was impregnated by immersing it in a two-molar solution of Ni nitrate including about 5% cobalt nitrate and cathodically forming $Ni(OH)_2$ in its pores. The cobalt is used to improve the charge efficiency of the electrodes. The completed electrodes comprised 24.7 gms of $Ni(OH)_2$ and 1.3 gms of $Co(OH)_2$, and had a theoretical capacity of about 7.52 ampere-hours (AH) each.

Test cells were assembled in an essentially noncompressed fashion such that the separator and bibulous mats (where used) were lightly held between the plates. The plates were immersed in the electrolyte (i.e., 20% by weight KOH) and "formed" to approximately 200% of the capacity (i.e., ampere-hours) of the nickel electrode. Thereafter, they were discharged at about the 3 hour rate (i.e., about 30 amps) to about 85% of the theoretical capacity (ampere-hour) of the nickel plate (i.e., to a cut-off voltage of about 1.0). Thereafter, the cells were recharged at about 9-12 amperes to a cut-off voltage of 2.25 volts or about 90% of the theoretical capacity of the nickel electrode (i.e., about 5% overcharge). This cycle was repeated and data collected during cycling.

FIG. 1 shows the retained capacities of substantially identical cells except for their zinc electrodes. The curve shown by the dashed line had a polystyrene binder for the zinc electrode while the cell represented by the solid line contained no customary binder but rather only repulped newsprint in admixture with the other active material ingredients. This cell had 13 positive plates and 14 negative plates arranged as described above. The negative plates had a zinc-plated copper grid (i.e., expanded metal) and an active material comprising 37.2 grams of zinc oxide, 0.56 grams HgO and the binder. The cell represented by the dotted line had 2.23 grams of polystyrene as the binder for the zinc oxide while the cell represented by the solid line had 4.3 grams of repulped newsprint mixed with the zinc oxide. Except for the absence of calcium, these zinc electrodes were made as described above. The polystyrene-bound electrode used an emulsion of polystyrene identified as Richamer HME and supplied by the Richardson Co. The several plates were assembled into a 27-plate 74 ampere-hour (AH) cell. The negative plates were wrapped with two layers of fibrous sausage casing (FSC) and the positive plates wrapped with two layers of polypropylene membrane, Celgard K-513. Celgard K-513 is essentially a laminate of Celgard 2400 (microporous polypropylene) and a nonwoven bibulous mat bonded to one side thereof and impregnated with appropriate wetting agents. The mat-side contacted the nickel plate. The data of FIG. 1 shows that after five cycles both cells had the same capacity (i.e., about 74 ampere-hours) while at 100 cycles the cellulose-zinc cell still had a capacity of 60 ampere-hours or about 81% of its original capacity, while the polystyrene zinc cell had a capacity of only 41 ampere-hours or about 55% of its original capacity. These cells had a ZnO-to-Ni(OH)$_2$ ampere-hour ratio of 3.26:1.

Figure 3:
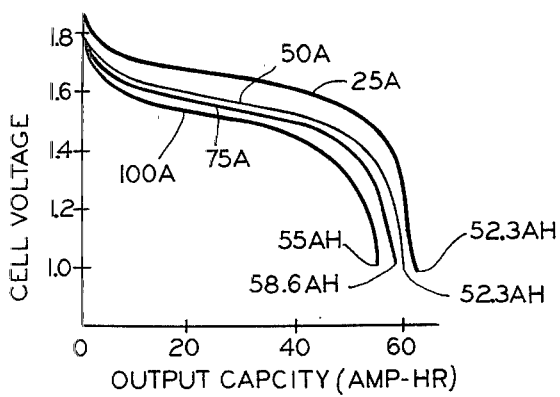
Figure 4:
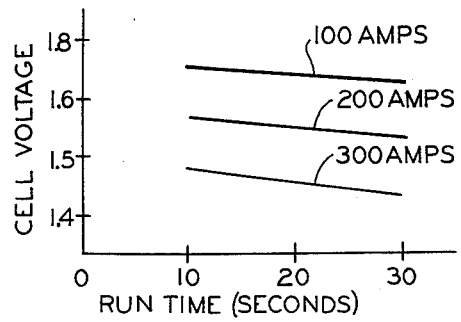

The solid curves A' and A" of FIG. 2 show the retained power and energy capacities respectively (i.e., in terms of percent of original power/capacity) of a particularly preferred embodiment of the invention. The test cells from which the FIG. 2 data (solid lines A' and A") was derived comprised 29 plates including 14 positive and 15 negative plates and each had a theoretical nickel electrode capacity of 105 ampere-hours. The nickel plates were as described above, whereas the central negative plates were as described hereafter. The end negatives had half the capacity of the central negative plates. Each central zinc electrode (in the unformed condition) comprised 20.1 gms of zinc oxide, 13.8 gms Ca(OH)$_2$, 1.35 gms Pb$_3$O$_4$ and 0.44 gms of newsprint. Some electrodes had a copper grid weighing about 5 gms and formed by punching a plurality of closely spaced one-quarter inch diameter holes across the face of a thin copper sheet. Other electrodes had expanded copper grids also weighing 5 gms. The average particle sizes for the ZnO, Ca(OH)$_2$ and Pb$_3$O$_4$ were about 1.6 microns, 7.9 microns and 2.3 microns, respectively. About 0.22 grams of the newsprint was diced into small squares less than one-quarter inch on each side to provide about 50% short cellulose fibers. The newsprint was added to about 400 milliliters of H$_2$O in a Waring blender and repulped to a homogeneous slurry of cellulose fibers. Thereafter, the zinc oxide, Ca(OH)$_2$ and Pb$_3$O$_4$ were added and blended into a homogeneous slurry and then cast onto the grid on a vacuum table. The plates were then pressed, dried and repressed to a finished thickness of about 0.038 inch. The zinc and nickel plates were then each wrapped with a bibulous mat of unwoven nylon (i.e. ca. 0.005 inch thick) which is 50-85% porous. Such material as Pellon 2501, Cerex 3605, 3607 and 3610 have proven successful. Unwoven polypropylene mats such as Kendall 1583 or Kimberly Clark's S-95 or S-96 have also proved effective. The mat spaces the separator from the plate and permits better circulation of electrolyte in the plate-separator space. The mat-wrapped electrodes were then each wrapped in two layers of microporous polypropylene separator material (i.e., Celgard 2400). Celgard 2500 has also been used successfully. The lower resistance 2500 separators are preferred for their high porosity (i.e., 45%) and larger pore size (i.e., 0.04×0.4 micrometers) and hence, lower internal resistance. The separators are folded over the bottom of the plates and heat sealed together along the sides thereof. These test cells had a theoretical capacity of about 105 ampere-hours, an actual working capacity (i.e., @ 85% depth of discharge) of about 89 ampere-hours and a ZnO:Ni(OH)$_2$ ampere-hour ratio of 1.76. As can be seen from curves A' and A" of FIG. 2, at 250 cycles the cell retained about 80% of its original capacity (i.e., energy) and about 96% of its original power. At 600 cycles the battery still retained about 25% of its original energy capacity. The power was determined by periodically drawing 300 amps from the cell for about 30 secs at the beginning of a discharge cycle. At the end of about 300 cycles, the cell was subjected to several discharge rates (i.e., between recharges) and the cell voltage drop and output capacity determined for the several rates. FIG. 3 shows how very little the cell's capacity varies with discharge rate. In this regard, at the 25 ampere rate that cell demonstrated a capacity of 62.3 AH and at the 100 ampere rate it demonstrated a capacity of 55 AH. Similarly, FIG. 4 shows how little the cell voltage falls off at very high discharge rates. Hence, even after over 300 cycles, the capacity of the preferred cells still demonstrated a surprising ability to deliver its energy even at very high rates.

Curve B of FIG. 2 shows the results of a test cell made in the identical fashion as set forth above for the test cells used to generate the curves A' and A" except that the newsprint (natural cellulose) was replaced with 0.88 grams of viscose rayon. Curve B: (1) shows that after 259 cycles the cell still had 72% of its original energy capacity; and (2) indicates that, accordingly, acceptable cells can be made from regenerated cellulose fibers as well as natural cellulose fibers.

Curve C of FIG. 2 shows the results of a test cell made in identical fashion as set forth above for the test cells used to generate the curves A' and A" except that the binder comprised a mixture of 0.25 grams of cellulose (i.e., newsprint) and 1.17 grams of styrene (Richamer HME). Curve C: (1) shows that after 193 cycles the cell still had 82% of its original energy capacity; and (2) indicates that acceptable zinc electrodes (energywise) can be made having other binders so long as those binders do not significantly interfere with the ability of the cellulose to adequately irrigate the electrode in support of Ca-zincate formation and persistance. General observations however suggest that such electrodes will not have the same useful life or power capabilities as the all-cellulose-bound electrodes.

Still other tests have been made with a cell containing 33 plates and a separator system like that described in conjunction with the 29 plate cell of FIG. 2. This cell had a theoretical capacity of about 119 AH derated to 101 AH at 85% of its theoretical capacity. The zinc electrodes have copper grids and an active material mix comprising 15.31 gms zinc oxide, 11.48 gms $Ca(OH)_2$, 1.04 gms $Pb_3O_4$ and 0.37 gms of newsprint. This cell has a $ZnO:Ni(OH)_2$ ampere-hour ratio of only 1.34 and after some 276 cycles has performed substantially the same as the above 29-plate test cell as shown in FIG. 2. Still further reductions in the zinc oxide/$Ni(OH)_2$ ratio are expected as the basic zinc electrode formulation is optimized. As this ratio is reduced, the energy density of cells made therefrom will increase.

While this invention has been disclosed primarily in terms of specific embodiments thereof, it is not intended to be limited thereto, but rather only to the extent set forth in the claims which follow.

The embodiments of the invention in which an exclusive property or privilege is claimed are defined as follows:

1. An alkaline nickel-zinc cell comprising in combination: a nickel electrode; a zinc electrode spaced from said nickel electrode; and an aqueous alkaline electrolyte permeating said zinc electrode and bridging the space between the electrodes; said zinc electrode comprising a conductive grid embedded in an active material mass, said mass comprising a substantially homogeneous mixture of (1) zinc-rich particles, (2) an additive selected from the group consisting of calcium oxide and calcium hydroxide particles for forming calcium zincate from said zinc-rich particles upon discharge of said cell, said calcium zincate being dissociable in high concentrations of said electrolyte, and (3) sufficient porous, wick-like, absorbent, hydrophilic fibers to so irrigate said mass with electrolyte as to maintain the concentration of said permeating electrolyte below the dissociation concentration of said calcium zincate.

2. An alkaline-nickel-zinc cell comprising in combination: a nickel electrode; a zinc electrode spaced from said nickel electrode; and an aqueous alkaline electrolyte permeating said zinc electrode and bridging the space between the electrodes; said zinc electrode comprising in its charged state a conductive grid embedded in an active material mass, said mass comprising a substantially homogeneous mixture of (1) zinc, (2) calcium hydroxide for forming calcium zincate from said zinc upon discharge of said cell, said calcium zincate being dissociable in concentrated electrolyte, and (3) a binder for said mixture, said binder consisting essentially of sufficient cellulose fibers to so irrigate said mass with electrolyte as to maintain the concentration of said permeating electrolyte below the dissociation concentration of said calcium zincate.

3. An alkaline nickel-zinc cell comprising in combination: a nickel electrode; a zinc electrode spaced from said nickel electrode; and an aqueous alkaline electrolyte bridging the space between the electrodes; said zinc electrode comprising in its unformed state a conductive grid embedded in a substantially homogeneous mixture of zinc oxide, an additive for forming calcium-zincate from said zinc oxide in the presence of said electrolyte, said additive being selected from the group consisting of calcium oxide and calcium hydroxide, and a binder for said mixture; said binder consisting essentially of sufficient cellulose fibers to hold said mixture in place on said grid and irrigate said mixture with said electrolyte.

4. An alkaline nickel-zinc cell comprising in combination: a nickel electrode; a zinc electrode spaced from said nickel electrode; and an aqueous potassium hydroxide electrolyte bridging the space between the electrodes and having a concentration of less than the dissociation concentration of calcium zincate; said zinc electrode comprising in its discharged state a conductive grid embedded in a substantially homogeneous mixture of calcium zincate and a binder for holding said calcium zincate in place on said grid; said binder consisting essentially of sufficient cellulose fibers to irrigate said zinc electrode with enough of said electrolyte to support the formation and persistance of said calcium zincate during cell discharge.

5. An alkaline-nickel-zinc cell comprising in combination: a nickel electrode; a zinc electrode spaced from said nickel electrode; and a potassium hydroxide electrolyte in the space bridging the electrodes; said zinc electrode comprising a copper grid embedded in a homogeneous mixture of comminuted zinc oxide, calcium hydroxide, $Pb_3O_4$ and natural cellulose fibers wherein the calcium hydroxide content is about 0.25 to about 1.5 moles of calcium hydroxide per mole of zinc oxide, the $Pb_3O_4$ content is up to about 4% by weight of the mixture and the cellulose content is about 0.5% to about 10% by weight of the mixture, said mixture being otherwise essentially free of customary binder materials.

6. An alkaline nickel-zinc cell comprising in combination: a nickel electrode; a zinc electrode spaced from said nickel electrode; and an aqueous alkaline electrolyte bridging the space between the electrodes; said zinc electrode comprising a conductive grid having a plurality of openings therein and embedded in a homogeneous mixture of zinc-rich particles, an additive for forming calcium zincate during discharge of said cell said additive being selected from the group consisting of calcium oxide and calcium hydroxide particles, and a binder for said mixture; said binder consisting essentially of sufficient natural cellulose fibers to hold said particles in place on said grid and irrigate said mixture with electrolyte.

7. An alkaline nickel-zinc cell comprising in combination: a nickel electrode; a zinc electrode spaced from said nickel electrode; and an aqueous alkaline electrolyte bridging the space between the electrodes; said zinc electrode comprising a conductive grid having a plurality of openings therein and embedded in a homogeneous mixture of zinc-rich particles, an additive for forming calcium zincate during discharge of said cell said additive being selected from the group consisting of calcium oxide and calcium hydroxide particles, and a binder for said mixture; said binder consisting essentially of sufficient natural cellulose fibers to hold said particles in place on said grid and irrigate said mixture with electrolyte, at least a portion of said fibers being smaller than the openings in said grid.

8. An alkaline nickel-zinc cell comprising in combination: a nickel electrode; a zinc electrode spaced from said nickel electrode; and an aqueous alkaline electrolyte bridging the space between the electrodes; said zinc electrode comprising in its charged state a conductive grid embedded in a substantially homogeneous mixture of zinc, calcium hydroxide and a binder for said mixture, said binder consisting essentially of sufficient natural cellulose fibers to hold said mixture in place on said grid and irrigate said mixture with said electrolyte.

9. An alkaline nickel-zinc cell comprising in combination: a nickel electrode; a zinc electrode spaced from said nickel electrode; and an aqueous alkaline electrolyte bridging the space between the electrodes; said zinc electrode comprising in its unformed state a conductive grid embedded in a substantially homogeneous mixture of zinc oxide, an additive for forming calcium-zincate from said zinc oxide in the presence of said electrolyte, said additive being selected from the group consisting of calcium oxide and calcium hydroxide and a binder for said mixture; said binder consisting essentially of sufficient natural cellulose fibers to hold said mixture in place on said grid and irrigate said mixture with said electrolyte.

10. An alkaline nickel-zinc cell comprising in combination: a nickel electrode; a zinc electrode spaced from said nickel electrode; and an aqueous potassium hydroxide electrolyte bridging the space between the electrodes and having a concentration of less than about 30% by weight KOH; said zinc electrode comprising in its discharged state a conductive grid embedded in a substantially homogeneous mixture of calcium zincate and a binder for holding said calcium zincate in place on said grid; said binder consisting essentially of sufficient natural cellulose fibers to irrigate said zinc electrode with said electrolyte.

* * * * *